Patented Feb. 10, 1953

2,628,184

UNITED STATES PATENT OFFICE 2,628,184

COMPOSITION OF MATTER TO DECREASE THE CIRCULATION OF BLOOD AND LYMPH IN VASCULAR AND ALLERGIC DISORDERS

Rudolph R. Widmann, Beverly Hills, Calif.

No Drawing. Application July 3, 1950, Serial No. 172,022

4 Claims. (Cl. 167—55)

My invention relates to new compositions of matter and novel combinations thereof which produce the new and beneficial result of decreasing the circulation of the blood and lymph in the tissues of areas affected by various disorders which have as their basic pattern a vascular congestion or dilation, which produces the symptoms and signs of the individual disease entities; and to methods of manufacturing or combining these compositions of matter to achieve these and other new and beneficial results.

The object of my invention is to provide a composition of matter which will aid in the correction of the vasodilating disorders such as erythermalgia, either primary or secondary, all allergic disorders such as hay fever, asthma and all related skin diseases such as eczema and other analogous diseases.

The preferred embodiment of my invention is a combination of the amino acid 1(—)-tyrosine with pyridoxine or its hydrochloride salt and the amide of nicotinic acid or niacinamide as it is better known. The resultant product of these three substances is an agent with adrenergic (vasoconstrictor) or adrenalin-like properties, such as tyramine, the amine of tyrosine; or a tyramine-like substance.

It has been demonstrated that pyridoxine and related compounds, that is, pyridoxal and pyridoxamine, are converted into codecarboxylase, the coenzyme of various bacterial amino acid apodecarboxylases, by the organisms capable of using them. This coenzyme, which has been synthesized from pyridoxal, is believed to be a phosphorylated derivative of pyridoxal, and is produced in the human body by the introduction of pyridoxine therein. The agent tyramine, with adrenalin-like properties, is the active end-product of the interaction between the amino acid tyrosine, the above mentioned phosphorylated derivative of pyridoxal which I shall hereinafter call phosphorylated pyridoxine, and the tissue decarboxylating enzyme of the body, tyrosine decarboxylase.

The niacinamide is included in my preferred composition of matter because it is believed to foster the phosphorylation of the pyridoxine, and in addition inhibits the opposing vasodilating-type of amine, histamine.

For the sake of brevity herein I will always hereinafter refer to 1(—)-tyrosine or alpha-amino-beta-para-hydroxyphenyl propionic acid (para-hydroxyphenyl alanine) as "tyrosine"; I will always refer to pyridoxine or its hydrochloride salt as "pyridoxine"; I will always refer to the amide of nicotinic acid or niacin as "niacinamide"; and I will always refer to the adrenergic end-product of my composition of matter having adrenalin-like properties as "tyramine."

Also, by the term "pyridoxine" herein I will include each of the following descriptive words or phrases: Vitamin $B_6$ and its hydrochloride salt, also known as adermin, shown to be identical with the factor Y of Chick and Copping, the antidermatitis factor of Hogan and Richardson, the "Vitamin H" of Booher, and the factor I of Lepkovsky, Jukes and Krause, closely related to codecarboxylase of the bacterial amino acid decarboxylases, and designated by the Council of Pharmacy and Chemistry of the American Medical Association as pyridoxine, a name first proposed by György and Eckhardt in 1939 and having the following chemical structure and designation:

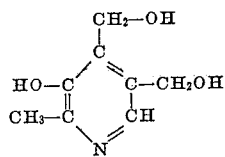

(2-methyl-3-hydroxy-4,5-di-(hydroxymethyl)-pyridine)

Pyridoxine is found in dried yeast, liver, rice polishings, meat, fish, whole wheat and corn and has been used as a catalyst of coenzyme activity for the enzyme tyrosine decarboxylase of Holtz. I have given pyridoxine and the mother-substance of tyramine, tyrosine, orally to patients with excellent results.

Clinically, an adrenergic end-product similar to tyramine has been shown to be produced when tyrosine and phosphorylated pyridoxine are combined with the tissue decarboxylase of Holtz. Thus, in the clinical use, so far as human disease processes are concerned, although pyridoxine has been used as the activating factor of the bacterial decarboxylating enzyme of Gale, which has been shown by Gale to require an optimum pH between 5 and 5.5, prior to my invention it was never used as the activating factor of the tissue decarboxylating enzyme of tyrosine.

Tyrosine, pyridoxine and niacinamide will not produce the results of my invention if they are administered in conjunction with ferrous salts.

My invention comprises the administration of tyrosine and pyridoxine, or tryrosine, pyridoxine and niacinamide in powdered, crystalline or liquid form. I was the first to administer tyrosine orally and I was first to administer tyrosine with pyridoxine, and tyrosine with pyridoxine and niacinamide, to transform the tyrosine into tyramine to combat the vasodilating type of congestive disorders.

I have invented two novel methods of successfully treating the vasodilating type of congestive disorders. My preferred method is to administer orally my novel powdered product, which is herein described in detail. Another method is to inject separately proper dosages of liquid tyrosine and liquid pyridoxine, or liquid tyrosine, liquid pyridoxine and liquid niacinamide.

My novel powdered composition of matter may be in any crystalline form such as powder, which may be called a "package," or tablets or pills made by compressing the powder with a suitable binding agent, which I will hereinafter refer to as a "solid package." Also it may consist of separate dosages of tyrosine and pyridoxine, or tyrosine, pyridoxine and niacinamide; or a single composition of the correct dosages of tyrosine and pyridoxine, or tyrosine, pyridoxine and niacinamide.

The preferred embodiment of my invention is a package which comprises a mixture of the proper proportions of powdered tyrosine, pyridoxine and niacinamide with a suitable binding agent, all of which is compressed into a tablet or pill. A package consisting of my preferred ingredients which have not been combined with a binding agent and compressed into a tablet or pill is equally as effective but is somewhat less convenient to handle than the solid package.

A suitable binding agent for my solid package is starch or starch in combination with sugar or dextrose. These binding agents are combined with the other ingredients using magnesium stearate, calcium stearate or talc as a lubricant. After the suitable binding agent and the lubricant have been combined with the other elements the resultant composition of matter is in a suitable condition to be compressed into either a tablet or a pill for convenience in administration.

A dosage of my composition of matter which has proven satisfactory has been made by mixing two hundred milligrams of powdered crystalline tyrosine, eight milligrams of powdered crystalline pyridoxine and ten milligrams of powdered crystalline niacinamide, though other proportions will work and it is to be understood that my invention is not limited to any specific relative proportions.

The preferred range of tyrosine for each dose of my product is from two hundred to one thousand milligrams (one gram), the preferred range of dosage of pyridoxine is from eight to forty milligrams and the preferred dosage of niacinamide is from ten to fifty milligrams. Various combinations within these ranges can be made but the preferred single dosage that covers the largest number of average cases is in the ratio of four hundred milligrams of tyrosine to sixteen milligrams of pyridoxine to twenty milligrams of niacinamide. Naturally the percentages within the preferred ranges may be varied according to the stage or severity of the disorder of the particular patient being treated.

Neither pyridoxine nor pyridoxine and niacinamide have been used in any form with tyrosine alone before I used them in my novel compositions of matter for the purpose of forming tyramine in the body. This is broadly new with me.

My invention has been found to be safe and to produce excellent clinical results when used for the treatment of the vasodilating disorders such as erythermalgia, either primary or secondary, all allergic disorders such as hay fever, asthma and all related skin diseases such as eczema. My composition is an important advance in medical science because of the prevalence of some of the disorders which it is effective in correcting.

The case report of the treatment of a young woman with my composition of matter comprising tyrosine and pyridoxine hydrochloride is set forth in California Medicine, November 1949, vol. 71, No. 5.

While I have described in some detail presently preferred embodiments of my product and presently preferred methods of performing my invention, it is to be understood that various modifications may be made therein within the scope of the subsequently appended claims.

I claim:

1. A composition of matter in which the sole essential active ingredients consist of a mixture of tyrosine and pyridoxine.

2. The composition of claim 1 containing from about 200 to about 1,000 parts by weight of tyrosine and from 8 to about 40 parts by weight of pyridoxine.

3. A composition of matter in which the sole essential active ingredients consist of a mixture of tyrosine, pyridoxine, and niacinamide.

4. The composition of claim 3 containing from about 200 to about 1,000 parts by weight of tyrosine, from 8 to about 40 parts by weight of pyridoxine, and from 10 to about 50 parts by weight of niacinamide.

RUDOLPH R. WIDMANN.

REFERENCES CITED

The following references are of record in the file of this patent:

UNITED STATES PATENTS

| Number | Name | Date |
|---|---|---|
| 2,445,208 | Charney | July 13, 1948 |

OTHER REFERENCES

U. S. Dispensatory, 24th Edition (1947), pages 1320 and 1561.

Hirshfeld, Archives of Otolaryngology, Volume 44, December 1946, pages 686 to 688.